(12) United States Patent
Posthuma

(10) Patent No.: US 6,748,078 B1
(45) Date of Patent: Jun. 8, 2004

(54) SYSTEM AND METHOD FOR ALLOCATING OVERHEAD VOLTAGE IN THE TRANSMISSION OF POTS AND XDSL SIGNALS

(75) Inventor: Carl Robert Posthuma, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/328,102

(22) Filed: Jun. 8, 1999

Related U.S. Application Data
(60) Provisional application No. 60/112,938, filed on Dec. 18, 1998.

(51) Int. Cl.[7] .......................... H04M 1/00; H04M 9/00; H04M 9/08
(52) U.S. Cl. ............ 379/413; 379/399.01; 379/413.01; 379/93.01
(58) Field of Search .................. 379/399.01, 93.01, 379/93.05, 93.08, 93.09, 93.29, 93.32, 93.34, 322–324

(56) References Cited

U.S. PATENT DOCUMENTS

| 5,323,461 A | * | 6/1994 | Rosenbaum et al. | |
|---|---|---|---|---|
| 5,583,934 A | | 12/1996 | Zhou | |
| 6,028,486 A | * | 2/2000 | Andre | 330/297 |
| 6,211,719 B1 | * | 4/2001 | deBrigard | 327/379 |
| 6,246,748 B1 | * | 6/2001 | Yano | |
| 6,366,644 B1 | * | 4/2002 | Sisk et al. | |
| 6,674,845 B2 | * | 1/2003 | Ayoub et al. | 379/93.05 |

FOREIGN PATENT DOCUMENTS

| EP | 0 840 486 | 5/1998 |
|---|---|---|
| EP | 0 849 928 | 6/1998 |
| WO | WO 99 39467 | 8/1999 |

* cited by examiner

Primary Examiner—Duc Nguyen

(57) ABSTRACT

A communication system and method for allocating overhead voltage between a telephonic switch and a user device is described. A line driver is located in the telephonic switch and is coupled to the user device. The line driver is in one of a plurality of communication states. A processor, coupled to the line driver, allocates the overhead voltage in response to the communication state of the line driver.

24 Claims, 3 Drawing Sheets

SYSTEM AND METHOD FOR ALLOCATING OVERHEAD VOLTAGE IN THE TRANSMISSION OF POTS AND XDSL SIGNALS

CROSS REFERENCE TO RELATED APPLICATION

This application claims the benefit of U.S. Provisional Application, Serial No. 60/112938 filed Dec. 18, 1998, and entitled Dynamic Allocation of Overhead Voltage To Allow Simultaneous Transmission Of POTS And ADSL Signals.

BACKGROUND

This invention relates to telecommunication systems that support both plain old telephone services (POTS) and digital subscriber line services (XDSL). The invention is especially suited but not limited to allocating overhead voltage for both the POTS and XDSL signals.

In the United States, telephone networks use batteries of approximately 48 to 52 Volts (V) of direct current (DC), located at a central office, to drive customer premises equipment (CPE), such as a standard telephone, at a customer premises. In a POTS mode of operation, a normal office battery voltage is acceptable because a standard CPE device typically needs at least between 16 to 22 milliamps (mA) of DC current to operate. The impedance of the telephone loop (path between the central office and the CPE) typically changes based on the loop configurations. When POTS and XDSL are transmitted simultaneously, the combination of POTS and XDSL overhead voltages along with the needed DC voltage are not fully supported by the output of the battery on some loop configurations. This results in lowering the maximum data rates of the XDSL signal and/or the voice quality of the POTS signal.

Attempts at solving this problem have included using higher voltage batteries, separate drive circuits for POTS and XDSL, and battery boost circuits. However, each of these solutions have included expensive new circuitry and the associated software to control it. Therefore, there is a need for a system and method for allocating overhead voltage to allow the transmission of POTS and XDSL signals either separately or simultaneously. There is a need to permit the use of normal office batteries in the United States with standard central office batteries.

SUMMARY

The above problems are solved and a number of technical advances are achieved in the art by implementation of a system and method that allows allocation of overhead voltage in the transmission of POTS and XDSL signals. In accordance with the invention, a method for allocating overhead voltage in a communication system for transmission of POTS and XDSL signals is described. The method comprises the steps of determining a communication state of a call for the communication system and allocating the overhead voltage in response to the communication state of the call.

Also, in accordance with the invention, a communication system for allocating overhead voltage between a telephonic equipment device—such as a switch, digital loop carrier (DLC), or digital subscriber line access multiplexer (DSLAM)—and a user device is described. The system comprises a line driver, located in the telephonic equipment device (telephonic switch), in signal communication with the user device wherein the line driver is in one of a plurality of communication states. The system also includes a processor in signal communication with the line driver, wherein the processor allocates the overhead voltage in response to the communication state of the system.

DESCRIPTION OF THE DRAWINGS

The foregoing advantageous features of the invention will be described in detail and other advantageous features will be made apparent upon reading the following detailed description that is given with reference to the several figures of the drawings in which.

DESCRIPTION

Figure 1:
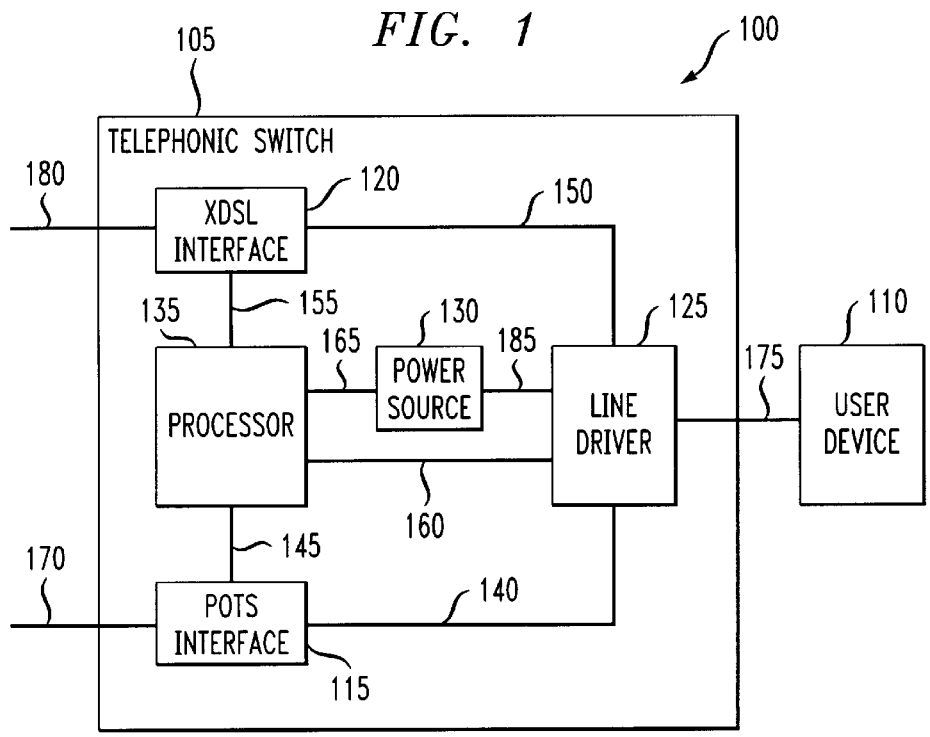
FIG. 1 is a functional block diagram of a communication system of the present invention.

In FIG. 1, a communication system 100 is shown having a telephonic equipment device also known as a telephonic switch 105—it can also be a digital loop carrier (DLC) or a digital subscriber line access multiplexer (DSLAM),—located at a central office, and a user device 110 in signal communication with the telephonic switch 105. The user device 110 is any device that allows communication with the telephonic switch 105 for both individual or combined communication with plain old telephone services (POTS) or digital subscriber line services (XDSL) provided by the telephonic switch 105. The "X" in XDSL represents one of a family of digital subscriber services such as ADSL (asynchronous), ADSL-lite, RDSL (rate-adaptive), and VDSL (very high speed).

Examples of a POTS device are a telephone, a customer premises equipment (CPE), computer modem, a switch board such as a public branch exchange (PBX), a local area network (LAN) hub, telemetry devices, telemetry interface units, or any similar equipment. Examples of an XDSL device are preferably high speed digital data versions of the same POTS type devices.

A number of functional sub-blocks are shown within the telephonic switch 105 including a POTS interface 115, XDSL interface 120, line driver 125, power source 130, and a processor 135. The POTS interface 115 is coupled to the line driver 125, via signal connection 140, and the processor 135 via signal connection 145. Similarly, the XDSL interface 120 is coupled to the line driver 125, via signal connection 150, and the processor 135 via signal connection 155. The processor 135 is coupled to the line driver 125, via signal connection 160, and the power source 130 via signal connection 165.

The POTS interface 115, provides an interface between digital incoming and outgoing communication signals on line 170, and analog signals carried on a subscriber line 175 via signal connection 140 and line driver 125. For example, line 170 may carry 64 Kbs per second pulse coded modulation (PCM) signals representative of analog information received from and transmitted to subscriber line 175.

The XDSL interface circuit 120 provides an interface between the telephonic switch 105 and a subscriber for terminating the receiving data at rates up to several megabits per second. Line 180 provides inbound and outbound high speed digital data communications, representative of information to and from the subscriber, carried on the subscriber line 175 via line 150 and line driver 125.

The line driver 125 combines both the POTS signals from the POTS interface 115 and the XDSL signals from the XDSL interface 120 and passes the combined signals to the user device 110 via subscriber line 175. The line driver 125 also provides the processor 135 with an electrical measurement signal of the electrical properties, such as line impedance, of the subscriber line 175 via signal connection 160. An example implementation of the line driver 125 would comprise of a circuit with a lattice of inductors and capacitors that provide filtering while maintaining direct current (DC) continuity required to support a battery feed current for POTS service. The line driver 125 also generally includes active electronic components such as amplification circuitry to drive the subscriber line 175. The combining and splitting circuitry of the line driver 125 may selectively be implemented in different chips or in one chip.

The power source 130 may selectively be a central office battery that preferably operates up to about 52 V. However, the power source 130 can also be a non-battery power source, such as a power supply, without changing the scope of the invention. The power source 130 is connected to the line driver 125 via signal connection 185. The power source 130 provides the line driver 125 with a DC drive voltage signal and an overhead voltage signal.

The processor 135 is connected to the power source 130 via signal connection 165. The processor 135 determines the voltage needs of the line driver 125 by determining the POTS state, the XDSL state, and the loop conditions of the communication system 100. The processor 135 is preferably part of the telephonic switch 105. The processor 135 uses the detection circuitry and processor capabilities of the telephonic switch 105 to determine the POTS state, the XDSL state, and the loop conditions of the communication system 100. The processor 135 is enabled to change the overhead voltage level by adjusting a resistor value or other means in the line drive 125. The processor could be part of the line interface card in the telephonic switch. An example of the processor may selectively be the Motorola Power PC, Intel Processor, or another similar processor.

The DC drive voltage signal is the voltage signal necessary to power the user device 110 from the telephonic switch 105. Based on Ohm's law and the loop impedance of the subscriber line 175 and the user device 110, the DC drive voltage may be selectively chosen to provide the user device 110 with approximately between 16 to 22 milliamps (mA) of DC current. As an example, 16 to 18 mA of DC current would preferably power any one telephone device or several electronic microphone telephone devices but it would not be enough to power multiple traditional carbon microphone telephone devices.

The overhead voltage is the amount of voltage necessary to drive an alternating current (AC) signal through the communication system 100 without saturating the amplification circuitry of the line driver 125. This process is also referred to as setting headroom voltage for the AC signal. The overhead voltage signal has an amplitude selectively chosen to drive a POTS signal from the POTS interface 115, an XDSL signal from the XDSL interface 120, or a combination of both based on a plurality of communication states for the communication system 100.

In a POTS service only situation where the POTS telephone is on hook there is no AC signal needed—unless on-hook transmission is needed—because there is no voice communication. Thus there is little to no need for a POTS overhead voltage and only the DC drive voltage is selectively transmitted to the subscriber line 175. Normally, the overhead voltage needed during an on hook conditions is small and approaches zero in value depending on the design of the amplification circuitry of the output stage of the line driver 125.

Figure 2:
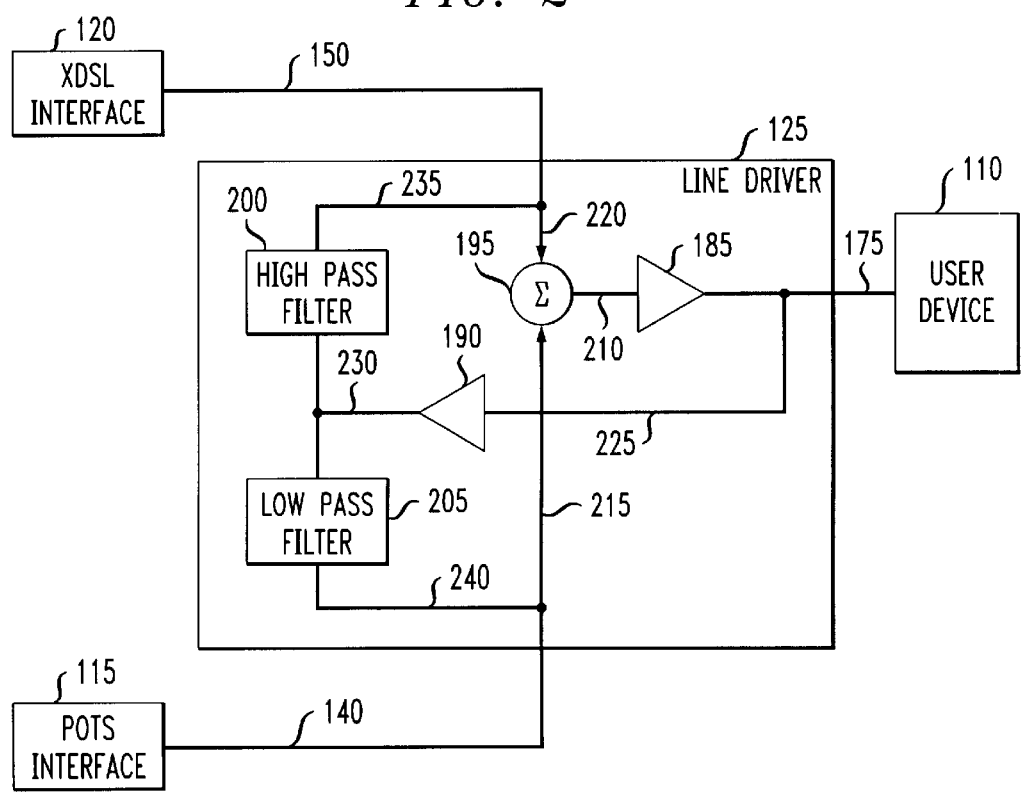
FIG. 2 is a functional block diagram of the line driver of FIG. 1.

FIG. 2 is an example implementation of the line driver 125. The line driver 125 includes a transmission amplifier 185, a reception amplifier 190, a signal combiner 195, a high pass filter 200, and a low pass filter 205. Both the transmission and reception amplifiers 185 and 190 are standard baseband or radio frequency amplification devices or circuits. The signal combiner 195 is any device or circuit that allows the POTS and XDSL signals to be combined into a common signal transmitted to the transmission amplifier 185 via signal connection 210. Examples of the signal combiner may be any analog combining or summing circuit.

In transmission mode, the line driver 125 receives a POTS signal from the POTS interface 115 via signal connection 140 and an XDSL signal from the XDSL interface 120 via signal connection 150. In the line driver 125, the POTS signal is coupled to the combiner circuit 195 via signal connection 215 and the XDSL signal is coupled to the combiner circuit 195 via signal connection 220. The POTS and XDSL signals are combined in the combiner circuit 195 and coupled to the transmission amplifier 185 via signal connection 210. The combined signal is then transmitted to the user device 110 via subscriber line 175.

In reception mode, the user device 110 transmits either a POTS signal, XDSL signal, or combined POTS and XDSL signal to the line driver 125. Reception amplifier 190 receives the signal via signal connection 225 and passes the signal to the high pass filter 200 and low pass filter 205 via signal connection 230. The high pass filter 200 filters out the low frequency components of the signal and passes the high frequency components, via signal connections 235 and 150 to the XDSL interface 120. The low pass filter 205 filters out the high frequency components of the signal and passes the low frequency components, via signal connections 240 and 140 to the POTS interface 115.

Figure 3:
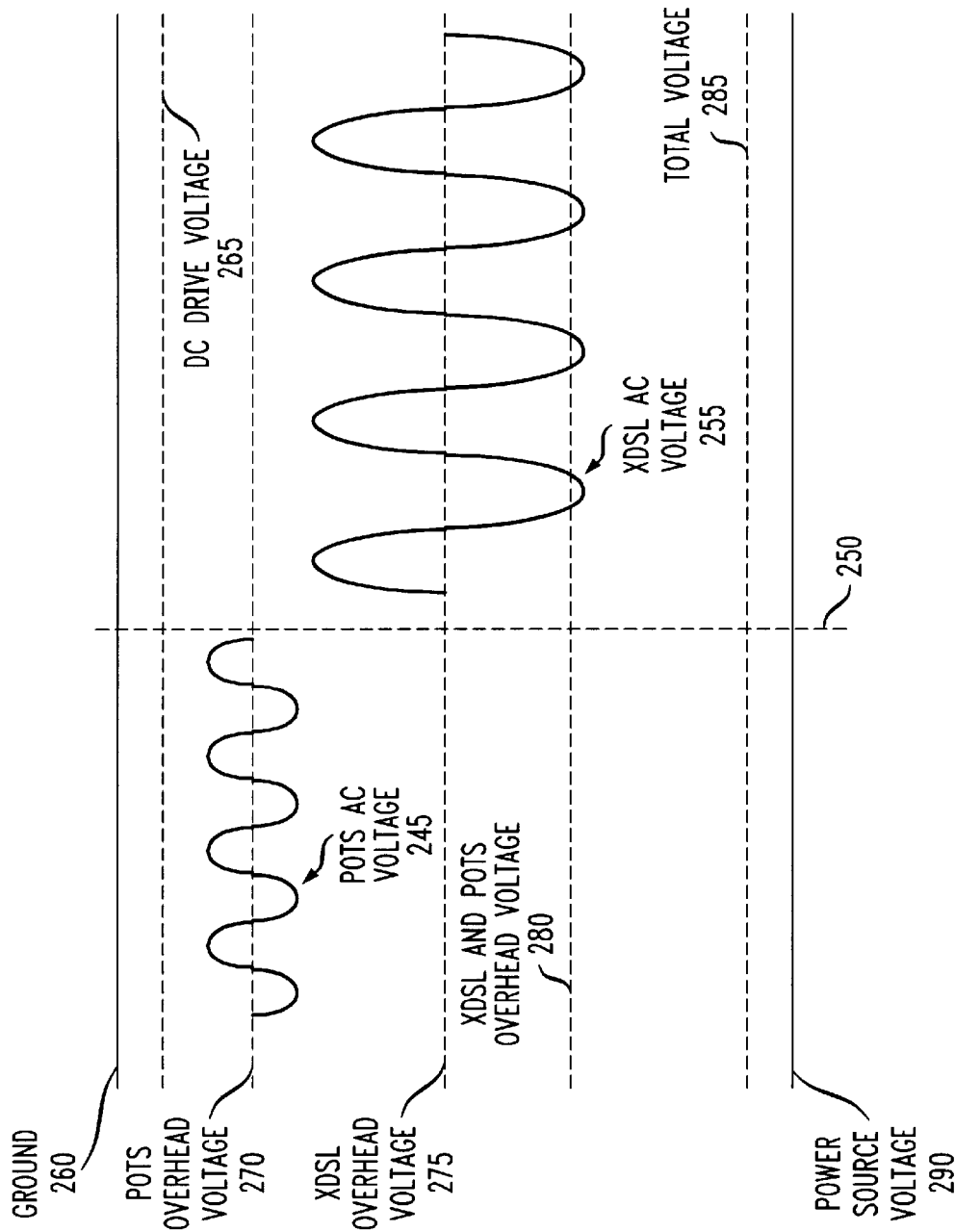
FIG. 3 illustrates the setting of overhead voltages, by the processor of FIG. 1, to allow for the passage of POTS or XDSL signals.

FIG. 3 illustrates the setting of overhead voltages to allow for the passage of AC POTS signals or XDSL signals without saturating the amplification circuitry in the line driver 125. In FIG. 3, a POTS AC voltage signal 245 is shown to the left of a vertical dashed line 250 and an XDSL AC voltage signal 255 is shown to the right of the vertical dashed line 250. The horizontal lines represent voltage levels. Line 260 represents ground. Dashed line 265 represents the DC drive voltage. Dashed line 270 represents the POTS overhead voltage. Dashed line 275 represents the XDSL overhead voltage. Dashed line 280 represents the combined voltage level of the POTS and XDSL overhead voltages. Dashed line 285 represents the total voltage for the communication system 100. The total voltage (line 285) is equal to the summation of the DC drive voltage (line 265), POTS overhead voltage (line 270), and XDSL overhead voltage (line 275). Finally, line 290 represents the output voltage of the power source 130 of FIG. 1.

FIG. 3 shows how a POTS overhead voltage 270 is selectively set to allow enough headroom to pass a POTS AC voltage signal 245 and how an XDSL overhead voltage 275 is set to allow enough headroom to pass an XDSL AC signal 255. The total voltage (line 285) is lower in amplitude than output voltage of the power source 130, FIG. 1 (line 290, FIG. 3), for proper operation of the communication system 100, FIG. 1.

The plurality of communication states of the communication system 100 (also referred to as a call priority) comprise a plurality of POTS states for the POTS signal, a plurality of XDSL states for the XDSL signal, and a plurality of loop condition states for the subscriber line 175. The POTS state is either in an on hook condition or off hook condition. An off hook condition signifies that the user device 110 is active. An example of an active user device 110 is when a telephone is picked up at a customer premises. A multiple off hook condition is also possible when multiple user devices 110 are active such as when multiple telephones are picked up at a customer premises. An on hook condition is when all telephones are hung up and inactive. The processor 135 determines the POTS state by measuring the change of electrical properties of the subscriber line 175, such as user device 110 impedance, via the line driver 125.

The loop conditions are the electrical properties of the communication loop. The communication loop includes the signal path from the line driver 125, though the subscriber line 175 to the user device 110 and back through the subscriber line 175 to the line driver 125. As an example, the electrical loop impedance of the communication loop is chosen as the electrical property (loop condition) measured by the line driver 125. As a result, the loop condition states are either in a high impedance state or a low impedance state. The loop impedance is preferably the summation of DC subscriber line 175 impedance and the off hook DC user device 110 impedance.

The XDSL state comprises a number of power states. For example purposes ADSL-lite will be used. ADSL-lite has the a number of power states such as a full power mode state (LO), a low power mode state (L1), a sleep with pilot mode state (L2), and a sleep mode state (L3).

The ADSL-lite states are defined in the International Telecommunications Union Telecommunications (ITU-T) recommendation G.992.2 (G.lite). LO is used for full high speed data transmissions. L1 is used for a reduced power mode transmission where control maintenance channels and some small amounts of payload data are passed between the telephonic switch 105 and the user device 110. L2 is an optional pilot mode state where only a plurality of pilot tones are sent to maintain synchronization between the telephonic switch 105 and the user device 110. L3 is used when there is no ADSL-lite communications between the telephonic switch 105 and the user device 110 but these devices are standing by ready to "wake up" (become active) and transmit data.

The various overhead voltages may be selectively adjusted in a dynamic way that allows for the maximum POTS and XDSL performance on a given customer loop while the POTS and XDSL services are in various communication states. Other factors that may selectively be used to determine the correct adjustment in overhead values include the power source 130, FIG. 1, voltage, the need for on hook transmission, the desire to minimize power dissipation within the communication system 100, and the need for periodic pulse metering (PPM) capability.

Depending on the desire of the service provider or the customer, the priority given to the various services (XDSL and POTS) can change. Some customers may desire a high priority on their XDSL service and when their user device 110 is active in an XDSL mode it will be given precedence over the POTS service. Others may desire the POTS service to have precedence. Finally, others may want to change the priority between POTS and XDSL depending upon different situations.

Figure 4:
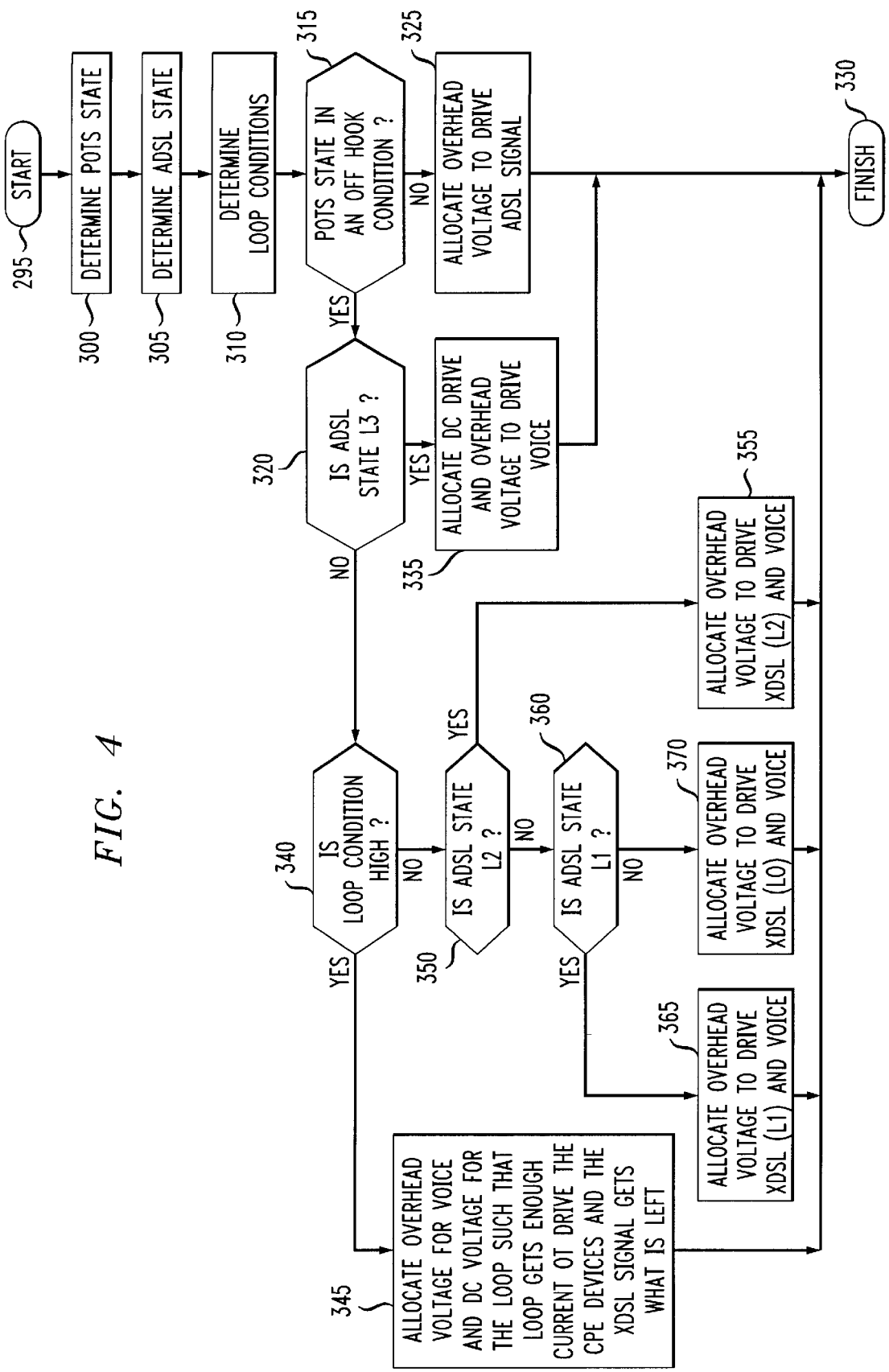
FIG. 4 is a logical flow diagram showing the steps performed by the communication system shown in FIG. 1.

FIG. 4 shows the processing that takes place in which the user of the user device 110, FIG. 1, or the service provider—the owner of the telephonic switch 105—wishes to give the POTS service the highest priority at the expense of the XDSL service. The process begins at step 295, FIG. 4. The processor 135, FIG. 1, determines the POTS state, in step 300, FIG. 4, the XDSL state, in step 305, and the loop conditions, in step 310, of the communication system 100, FIG. 1. In decision step 315, if the POTS state is in an off-hook condition the process continues to decision step 320. If instead, the POTS state is not in an off-hook condition, the process continues to step 325. In step 325, the processor 135, FIG. 1, allocates the overhead voltage, from the power source 130 to the line driver 125, to drive an XDSL signal. The process then ends in step 330.

In decision step 320, FIG. 4, if the XDSL state is in L3, the process continues to step 335. In step 335, the processor 135, FIG. 1, allocates enough DC drive voltage and the overhead voltage to drive a POTS signal (voice) and the process ends in step 330. If instead the XDSL is not in L3, the process continues to decision step 340. In decision step 340, if the processor 135, FIG. 1, determines that the loop condition is high, the process continues to step 345. In step 345, the processor 135, FIG. 1, allocates the DC drive voltage and overhead voltage for both POTS (voice) signals and XDSL signals. The processor 135 allocates enough DC drive voltage and overhead voltage to provide the communication system 100 with enough current to drive the user device 110 for POTS (voice) while allowing the XDSL signal to use the remaining voltage. The process then ends in step 330.

If the processor 135, FIG. 1, in step 340, FIG. 4, instead determines that the loop condition is not high, the process continues to decision step 350. In decision step 350, the processor 135, FIG. 1, determines whether the XDSL state is in L2. If the XDSL state is L2, the process continues to step 355, FIG. 4, and the controller 135, FIG. 1, allocates the overhead voltage to drive an XDSL signal in L2 with a POTS signal. The process then ends in step 330, FIG. 4.

If instead the XDSL state is not in L2, in decision step 350, the process continues to decision step 360. In decision step 360, the processor 135, FIG. 1, determines if the XDSL signal is in L1. If the XDSL signal is in L1, the processor 135 in step 365, FIG. 4, allocates the overhead voltage to drive an XDSL signal in L1 and a POTS signal. The process then ends in step 330. If instead, the XDSL signal is in LO, the processor 135, FIG. 1, in step 370, FIG. 4, allocates the overhead voltage to drive an XDSL signal in LO and a POTS signal. The process then ends in step 330.

Thus, when the POTS state is in an on hook state the processor 135, FIG. 1, selectively allows the ADSL service to take all the AC overhead that the ADSL service needs to send full ADSL data rates. In this case, POTS AC overhead voltage is not needed except for on-hook transmissions. When the POTS state is in an off hook state the processor 135, FIG. 1, limits the ADSL overhead voltage to allow for full DC drive current and POTS overhead voltage on the loop that the communication system 100 will need. The processor 135 will also allow for the DC drive current that is needed for the particular loop that is being served.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics.

The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention are thus within its spirit and scope.

What is claimed:

1. A method for allocating overhead voltage in a communication system for transmission of POTS and XDSL signals comprising the steps of:
   determining a communication state of a call for the communication system; and
   allocating the overhead voltage in response to the communication state of the call;
   wherein the step of determining a communication state of a call further includes the steps of
   determining a loop condition state for the communication system,
   determining the state of the POTS signal, and
   determining the state of the XDSL signal in response to the loop condition.

2. The method of claim 1 wherein the loop condition state comprises
   a high impedance state and
   a low impedance state.

3. The method of claim 1 wherein the state of the POTS signal comprises
   an on hook state and
   an off hook state.

4. The method of claim 1 wherein the state of the XDSL signal comprises
   a full power mode state,
   a low power mode state,
   a sleep with pilot mode state, and
   a sleep mode state.

5. A method for allocating overhead voltage in a communication system for transmission of POTS and XDSL signals comprising the steps of:
   determining a loop condition for the communication system;
   determining the state of the POTS signal;
   determining the state of the XDSL signal in response to the loop condition; and
   allocating the overhead voltage in response to the loop condition, state of the POTS signal, and state of the XDSL signal.

6. The method of claim 5 wherein the loop condition state comprises
   a high impedance state and
   a low impedance state.

7. The method of claim 5 wherein the state of the POTS signal comprises
   an on hook state and
   an off hook state.

8. The method of claim 5 wherein the state of the XDSL signal comprises
   a full power mode state,
   a low power mode state,
   a sleep with pilot mode state, and
   a sleep mode state.

9. A communication system for allocating overhead voltage between a telephonic network device and a user device comprising:
   a line driver, located in the telephonic switch, in signal communication with the user device wherein the line driver is in one of a plurality of communication states; and
   a processor in signal communication with the line driver, wherein the processor allocates the overhead voltage in response to the communication state of the line driver;
   wherein the plurality of communication states comprises
   a plurality of POTS states,
   a plurality of XDSL states, and
   a plurality of loop condition states.

10. A communication system for allocating overhead voltage between a telephonic network device and a user device comprising:
    a line driver, located in the telephonic switch, in signal communication with the user device wherein the line driver is in one of a plurality of communication states; and
    a processor in signal communication with the line driver, wherein the processor allocates the overhead voltage in response to the communication state of the line driver;
    wherein the plurality of communication states comprises
    a plurality of POTS states and a plurality of XDSL states, wherein the plurality of POTS states comprises
    an on hook state and
    an off hook state.

11. A communication system for allocating overhead voltage between a telephonic network device and a user device comprising:
    a line driver, located in the telephonic switch, in signal communication with the user device wherein the line driver is in one of a plurality of communication states; and
    a processor in signal communication with the line driver, wherein the processor allocates the overhead voltage in response to the communication state of the line driver;
    wherein the plurality of communication states comprises
    a plurality of XDSL states, wherein the plurality of XDSL states comprises
    a full power mode state,
    a low power mode state,
    a sleep with pilot mode state, and
    a sleep mode state.

12. A communication system for allocating overhead voltage between a telephonic network device and a user device comprising:
    a line driver, located in the telephonic switch, in signal communication with the user device wherein the line driver is in one of a plurality of communication states; and
    a processor in signal communication with the line driver, wherein the processor allocates the overhead voltage in response to the communication state of the line driver;
    wherein the plurality of communication states comprises
    a plurality of loop condition states and a plurality of XDSL states, wherein the plurality of loop condition states comprises
    a high impedance state and
    a low impedance state.

13. The communication system of claim 9 wherein the telephonic network device is a telephonic switch.

14. The communication system of claim 9 wherein the telephonic network device is a digital loop carrier.

15. The communication system of claim 9 wherein the telephonic network device is a digital subscriber line access multiplexer.

16. A communication system for allocating overhead voltage for transmission of POTS and XDSL signals comprising:
   a processor,
   means for determining a communication state of a call for the communication system with the processor; and
   means for allocating the overhead voltage in response to the communication state of the call with the processor;
   wherein the determining means further includes
      means for determining a loop condition state for the communication system,
      means for determining the state of the POTS signal, and
      means for determining the state of the XDSL signal in response to the loop condition.

17. The system of claim 16 wherein the loop condition state comprises
   a high impedance state and
   a low impedance state.

18. The system of claim 16 wherein the state of the POTS signal comprises
   an on book state and
   an off hook state.

19. The system of claim 16 wherein the state of the XDSL signal comprises
   a full power mode state,
   a low power mode state,
   a sleep with pilot mode state, and
   a sleep mode state.

20. The communication system of claim 11 wherein the telephonic network device is a telephonic switch.

21. The communication system of claim 11 wherein the telephonic network device is a digital loop carrier.

22. The communication system of claim 11 wherein the telephonic network device is a digital subscriber line access multiplexer.

23. The communication system of claim 10 wherein the plurality of XDSL states comprises
   a full power mode state,
   a low power mode state,
   a sleep with pilot mode state, and
   a sleep mode state.

24. The communication system of claim 12 wherein the plurality of XDSL states comprises
   a full power mode state,
   a low power mode state,
   a sleep with pilot mode state, and
   a sleep mode state.

* * * * *